(12) United States Patent
Kuwabara et al.

(10) Patent No.: US 8,801,289 B2
(45) Date of Patent: Aug. 12, 2014

(54) LINEAR MOTION GUIDE UNIT

(71) Applicant: Nippon Thompson Co., Ltd., Tokyo (JP)

(72) Inventors: Hideki Kuwabara, Mino (JP); Yoshihiro Yoshida, Mino (JP)

(73) Assignee: Nippon Thompson Co., Ltd., Tokyo (JP)

( * ) Notice: Subject to any disclaimer, the term of this patent is extended or adjusted under 35 U.S.C. 154(b) by 0 days.

(21) Appl. No.: 13/661,573

(22) Filed: Oct. 26, 2012

(65) Prior Publication Data
US 2013/0108193 A1 May 2, 2013

(30) Foreign Application Priority Data
Oct. 27, 2011 (JP) ................................. 2011-235957

(51) Int. Cl.
*F16C 29/06* (2006.01)
*F16C 33/10* (2006.01)

(52) U.S. Cl.
USPC .............................................. 384/44; 384/13

(58) Field of Classification Search
CPC .. F16C 29/06; F16C 29/0602; F16C 29/0611; F16C 29/0633; F16C 29/0635; F16C 29/0638; F16C 29/064; F16C 29/0642; F16C 29/0645; F16C 29/0647; F16C 29/065; F16C 29/0652; F16C 29/0654; F16C 29/0657; F16C 29/0659; F16C 29/0661; F16C 29/0664; F16C 29/0666

USPC .................. 384/13, 43–45, 49, 50, 52, 54, 57
See application file for complete search history.

(56) References Cited

U.S. PATENT DOCUMENTS

| | | | | |
|---|---|---|---|---|
| 5,800,064 | A * | 9/1998 | Ohya ............................... | 384/44 |
| 6,712,511 | B2 * | 3/2004 | Matsui et al. ................... | 384/45 |
| 7,354,198 | B2 * | 4/2008 | Nishihara ........................ | 384/13 |
| 7,762,722 | B2 * | 7/2010 | Kuwabara et al. .............. | 384/44 |

FOREIGN PATENT DOCUMENTS

JP        09-072335        3/1997

* cited by examiner

*Primary Examiner* — James Pilkington
(74) *Attorney, Agent, or Firm* — Browdy and Neimark, PLLC

(57) ABSTRACT

A circular sleeve is disclosed which fits into a lengthwise bore in a slider to provide a return passage to make sure of smooth rolling in a slider downsized or compact in length. The sleeve is inserted with leaving circular clearances inside the lengthwise bore in the slider. The sleeve has a bridged beam portion and cantilevered beam portions all of which may undergo elastic deformation under urging or impact force caused by rollers while rolling through the return passage. The bridged beam portion is flanked by support beam portions forming the outside circular surface of the sleeve and the cantilevered beam portions are fastened at their inward ends to a middle support beam portion and freed at their outside ends to bend or warp.

8 Claims, 6 Drawing Sheets

LINEAR MOTION GUIDE UNIT

FIELD OF THE INVENTION

The present invention relates to a roller-type linear motion guide unit in which a slider is allowed sliding along an elongated guide rail relatively to the guide rail through a plurality of rollers and more particularly to a roller-type linear motion guide unit more compact than ever in construction because a carriage of the slider is designed miniature, that is short and small in construction.

BACKGROUND OF THE INVENTION

A diversity of linearly reciprocating mechanisms and so on installed in recent years in semiconductor manufacturing equipment, precision machines, measurement/inspection instruments, medical equipment, robots, assembling machines, transporting machines, micromachines and so on is designed compact or reduced in construction in favor of energy saving or high energy efficiency. Correspondingly, linear motion guide units built in relatively sliding parts used in the machinery stated just earlier are also needed compact or downsized in construction while expected to carry heavy loads and make sure of smooth movement of the slider relative to the guide rail. The roller-type linear motion guide units are advantageous to heavier load-carrying capacity, but they are limited in downsizing or miniaturization of the slider. One of major challenges in the roller-type linear motion guide unit, thus, resides in downsizing in construction of the slider, especially making the slider short and small in size.

In a commonly-owned Japanese Laid-Open Patent Application No. H09-72 335 there is disclosed a linear motion guide unit in which a circular sleeve to provide a return passage fits into a lengthwise bore made in a carriage of a slider. The sleeve is made to undergo elastic deformation. More especially, the sleeve is anchored at lengthwise ends thereof in the bore in the carriage and reduced radially at the middle between the ends to make a circular clearance to isolate a circular surface of the sleeve away from the circular inside of the bore. The sleeve is further made with a lengthwise slit to undergo easily elastic deformation at the middle of the sleeve. Thus, the sleeve constructed as stated just earlier helps absorb or alleviate sliding resistance applied on the rolling elements to make sure of smooth running or movement of the rolling elements.

With the prior linear motion guide unit constructed as stated earlier, the sleeve for the return passage is great in the overall length and, correspondingly, the radially reduced middle thereof susceptible to the elastic deformation is also longer relatively to the radially thick ends. With the downsized roller-type linear motion guide unit, however, the carriage built in the slider needs to be downsized or compact in construction, especially short in length. As it does, the sleeve inserted into the bore in the carriage has to be made miniature and short in length as well. That in turn will show that the sleeve at the radially reduced middle thereof becomes too less in thickness to ensure the durability of the sleeve. Where making the sleeve at the radially reduced middle thereof greater in thickness in favor of the durability of the sleeve, the sleeve short in length is hard to undergo the elastic deformation at the reduced middle. As a result, it remains a major challenge to the prior downsized linear motion guide unit to make certain of smooth relative sliding movement of the slider.

SUMMARY OF THE INVENTION

The present invention, therefore, has as its primary object to overcome the problem as described just above and to further provide a linear motion guide unit miniature, especially downsized in length, in which a sleeve inserted into a bore in a carriage to provide a return passage is better in durability while making sure of smooth sliding movement of a slider relative to a guide rail. The present invention is befitted for a miniature or compact linear motion guide unit in which a slider, or a carriage in the slider, is more downsized or short and small in length compared with the standard type of ordinary linear motion guide units. More especially, the present invention is most befitted for the provision of the miniature or compact roller-type linear motion guide unit having the slider which is downsized in construction, especially short and small in length.

The present invention is concerned with a linear motion guide unit comprising; a guide rail having first raceway surfaces extending lengthwise and a slider that fits over or conforms to the guide rail for movement relatively to the guide rail, the slider being composed of a carriage having second raceway surfaces lying in opposition to the first raceway surfaces of the guide rail to define load-carrying races between the first raceway surfaces and the second raceway surfaces and return passages extending in parallel with the second raceway surfaces, end caps secured on opposite ends of the carriage, one to each end, the end caps each having turnaround passages to connect the load-carrying races with the return passages, a plurality of rolling elements allowed to roll through circulating circuits each made up of the load-carrying race, return passage and the turnaround passages, and circular sleeves that fit into lengthwise bores in the carriage to provide the return passages;

wherein the circular sleeves that fit into the lengthwise bores in the carriage each have two members of regions susceptible to elastic deformation lying in opposition to each other with leaving clearances between the circular sleeves and the lengthwise bore to make it easier to undergo the elastic deformation under an impact force caused by the rolling elements, one of the two members of the regions susceptible to elastic deformation being a bridged beam portion supported at both ends thereof and flanked by support beam portions which extend lengthwise in opposite directions to form an outside circular surface of the circular sleeve, and another of the two members of the regions susceptible to elastic deformation being a pair of cantilevered beam portions which are fastened or retained at inside ends thereof to a middle support beam portion lying to form the outside circular surface of the circular sleeve and freed at outside ends thereof to bend or warp.

In accordance with the present invention, there is provided a linear motion guide unit wherein the rolling elements are rollers, the circular sleeve has a through-hole having a rectangular shape in a cross section, and the bridged beam portion and the cantilevered beam portions provide rolling contact raceway surfaces which make line-contact with circular rolling surfaces of the rollers.

In accordance with the present invention, the bridged beam portion is provided with rounded dents at boundaries between a middle beam portion of the bridged beam portion and the support beam portions to render the middle beam portion integral with the support beam portions easier to suffer the elastic deformation. Moreover, the cantilevered beam portions have rounded dents at ends thereof integrally joined with the middle support beam to make the cantilevered beam portions easier to undergo the elastic deformation.

In accordance with the present invention, the circular sleeve has sidewise opposite lateral sides which are integral with between the support beam portions which support the bridges beam portion, and at the same time are integral with the middle support beam portion which bears the cantilevered beam portions, and wherein the lateral sides are partially separated by slots or narrow openings from the bridged beam portion while isolated by the slits from the cantilevered beam portions, so that the bridged beam portion and the cantilevered beam portions are allowed to undergo the elastic deformation independently of each other.

In accordance with the present invention, there is provided a linear motion guide unit wherein the cantilevered beam portions are place in mating with inside curved halves of the turnaround passages and the support beam portions extending on both sides of the bridged beam portions are placed in mating with outside curved halves of the turnaround passages. The support beam portions lying on opposite sides of the bridged beam portions extend lengthwise over the cantilevered beam portions to have protrusions, and the protrusions fit into recesses in the end caps. Moreover, lubricating members to apply lubricant around the rollers are placed between the carriage and the end caps in the slider.

The roller-type linear motion guide unit compact, especially, downsized or short and small in length of the present invention is developed with the return passage of the circular sleeve constructed as stated earlier. More particular, the circular sleeve of the present invention, while having a tubular thickness in favor of the durability of the circular sleeve, has the bridge beam portion and a pair of the cantilevered beam portions lying widthwise opposite the bridge beam portion and extending lengthwise in opposite directions, thereby undergoing easily any elastic deformation under even small impact or urging force caused by any variations in sliding motion of small rolling elements of rollers. Thus, either of the cantilevered beam portions and the bridged beam portion in the circular sleeve can suffer the elastic deformation in two stages and therefore deal more flexibly with the impact or urging force caused by the clogged conditions of the rollers to ensure the smooth sliding motion of the slider. It is said that the roller-type linear motion guide unit of the present invention even with the linear motion guide unit compact or downsized in length has high load-carrying capacity. The circular sleeve has the bridged beam portion supported at the opposite ends thereof and the cantilevered beam portions lying in opposition to the bridged beam portion. The bridged beam portion has the rounded dents at the ends integrally joined with the support beam portions to make the elastic deformation easier and ensure the durability of the bridged beam portion. More especially, the cantilevered beam portions lying in mating with the inside curved halves of the turnaround passages, even when their free ends has any variation out of the turnaround passages, would have a little or negative impact on the running condition of the rolling elements. Moreover, since the overall length including the bridged beam portion is over the overall length including the cantilevered beam portions, the mating edges between the circular sleeve and the turnaround passages are staggered between the inside curved halves and the outside curved halves of the turnaround passages from each other in a stepwise fashion in a rolling direction of the rollers, so that the rollers are permitted to move past across any mating edges between the circular sleeve and the turnaround passages without falling into or stumbling at the mating edges, thereby rolling throughout the circulating circuits with no objection.

DETAILED DESCRIPTION OF THE PREFERRED EMBODIMENTS

Figure 1:
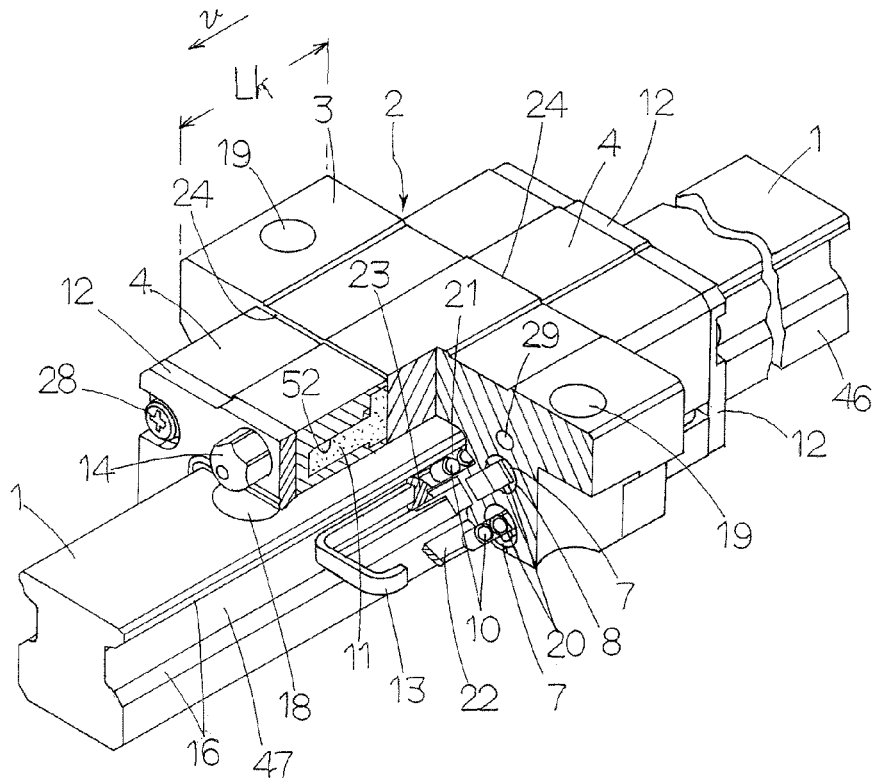
FIG. 1 is a view in perspective, partially broken away, showing a preferred embodiment of a linear motion guide unit according to the present invention.
Figure 2:
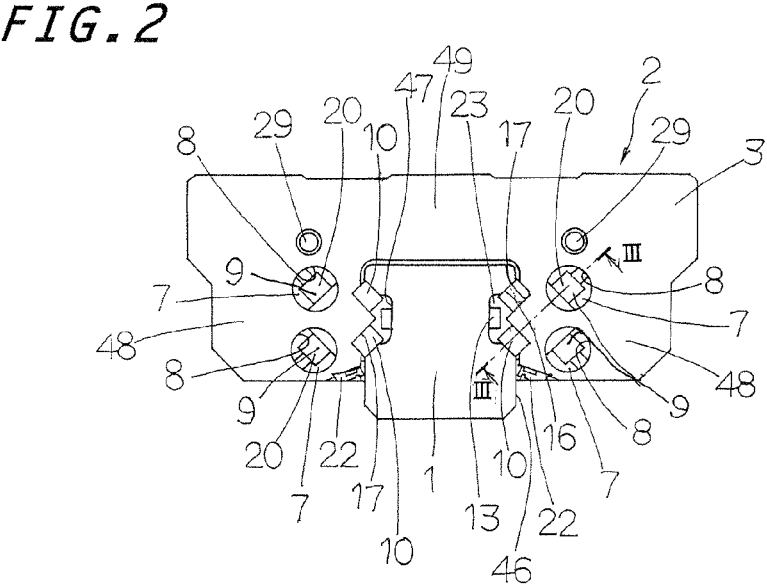
FIG. 2 is a view in end elevation of the linear motion guide unit according to the present invention, in which an end cap is removed to shown a carriage of a slider.

The linear motion guide unit in accordance with the present invention is adapted for use in a relative sliding system of a variety of machinery including semiconductor fabricating equipment, precision machines, measurement/inspection instruments, medical equipment, mechanical robots, assembling machines, conveyors, machine tools, micromechanical machines, and so on. A preferred embodiment of the linear motion guide unit according to the present invention will be hereinafter described with reference to the accompanying drawings. The linear motion guide unit of the present invention, as shown in FIGS. 1 and 2, is of a roller-type compact or less in length in which rollers 10 are employed as rolling elements. With the linear motion guide unit constructed according to the present invention, a carriage 3 has a length (Lk) parallel to only 40% of a widthwise dimension of the carriage 3. The carriage 3 has threaded holes 19 which are made spaced widthwise from each other, one to each sidewise overhang, and are used to fasten any instrument to a slider 2. Compared with the carriage of the standard type used extensively, the carriage 3 in the present invention is designed to have about 60% of the standard type in a lengthwise direction in the traveling direction of the slider 2. The linear motion guide unit of the present invention is in general comprised of an elongated guide rail 1 provided on lengthwise sides 46 thereof with relief grooves 47 in each of which a pair of raceway surfaces or first raceway surfaces 16 is formed, and the slider 2 that fits over or conform to the guide rail 1 in a way moving relatively to the guide rail 1 through the rollers 10 serving as rolling elements. The slider 2 is mainly composed of the carriage 3 having raceway surfaces or second raceway surfaces 17 lying in opposition to the first raceway surfaces 16 on the guide rail 1 to define load-carrying races 21 between the first raceway surfaces 16 and the second raceway surfaces 17 and return passages 20 extending in parallel with the load-carrying races 21, end caps 4 fastened to lengthwise opposite ends 24 of the carriage 3 and each made therein with a pair of non-loaded turnaround passages 15 of arc shape to communicate the load-carrying races 21 with the return passages 20, and a plurality of rollers 10 of rolling elements rolling through circulating circuits 30 each of which is made up of the load-carrying race 21, the turnaround passages 15 in the end caps 4 and the return passage 20. Moreover, the return passages 20 are defined with through-holes 9 extending inside the circular sleeves 7 which are inserted into paired lengthwise bores 8 which are formed in side bulges 48, one pair to each side bulge 48 of the carriage 3.

With the linear motion guide unit constructed as stated earlier, the carriage 3 as shown in FIG. 2 is constituted with a major portion 49 lying just above the guide rail 1 and the side bulges 48 spreading sidewise beyond the sides 46 of the guide rail 1 and extending lengthwise along the sides 46 of the guide rail 1. In the side bulges 48 of the carriage 3, there are provided four rows of the load-carrying races 21 are provided, two rows for each side bulge 48. The load-carrying races 21 are connected with their associated return passages 20 and turnaround passages 15, respectively, to complete the circulating circuits 30. Any number of roller 10 rolling through any one of the paired circulating circuits 30 in the side bulge 48 circulates from the downside load-carrying race 21 carrying thereon an downward load of the slider 2 into the upside return passage 20 in the carriage 3 while other rollers 10 running through another circuit 30 circulate from the upside load-carrying race 21 carrying thereon an upward load of the slider 2 into the downside return passage 20 in the carriage 3. The linear motion guide unit of the present invention, moreover, has end seals 12 arranged on outward ends of the end caps 4 and provided with lips to close or seal up clearances left between the guide rail 1 and the slider 2, and lower seals 22 extending across the overall length of the carriage 3 and end caps 4. Thus, the slider 2 is overall sealed or closed to exclude dirt and foreign material. On assembling the carriage 3 with the end caps 4 and the end seals 12 into the slider 2, fastening screws 28 are tightened into threaded holes 29 in the carriage 3 after having extended through holes in the end caps 4 and the end seals 12. The guide rail 1 has some holes 18 that are spaced away from each other at a preselected interval in the lengthwise direction of the guide rail 1, the holes 18 being used to fasten the guide rail 1 with bolts to any stationary bed including a machine bed, mounting base, and so on. On the other hand, the carriage 3 has the threaded holes 19 that are used to fasten any instruments, works, mounting parts and the like to the slider 2. The end caps 4 is each constituted with an end cap major part 5 to define an outside curved groove of the turnaround passage 15 and a spacer part 6 nested in the end cap major part 5 to define an inside curved groove of the turnaround passage 15.

Figure 3:
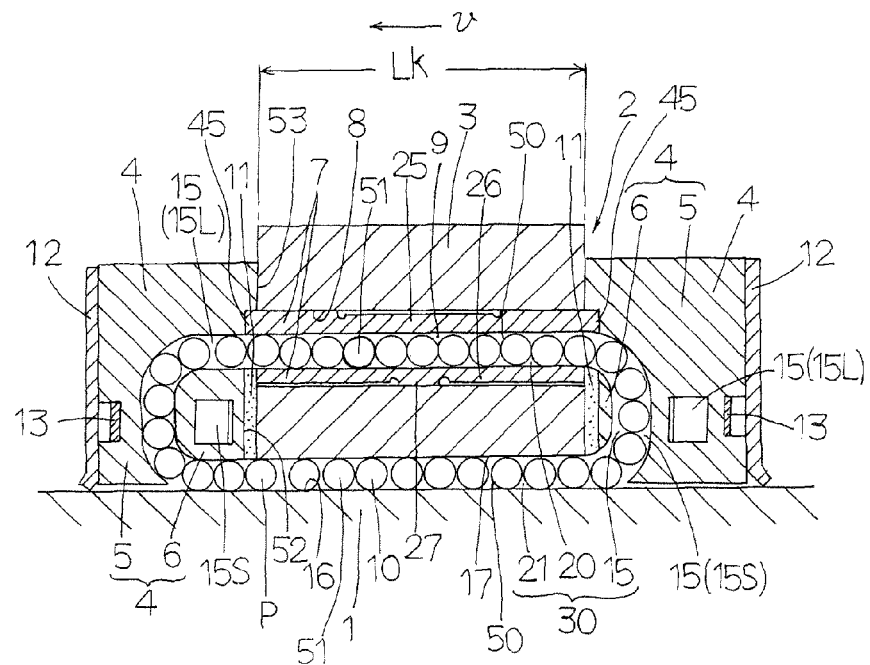
FIG. 3 is a view explanatory of a circulating circuit in the slider, the view being a longitudinal section taken on the plane of the line III-III of FIG. 2.

With the linear motion guide unit of the present invention, the turnaround passages 15 are arranged in pair in sidewise bulged portions of the end caps 4 so as to intersect each other and at the same time lie in such staggered relation that any one of the turnaround passages 15 is further out than the other in the lengthwise direction of the slider 2. Especially as shown in FIG. 3, any one of the circulating circuits 30 intersected at right angles and staggered in the lengthwise direction each other is constituted with an outer turnaround 15L of long arc in one of the end caps 4, the load-carrying race 21, return passage 20 and an inner turnaround 15S of short arc in another of the end caps 4. Another of the circulating circuits 30, by the way of contrast, is constituted with an inner turnaround 15S of short arc in one of the end caps 4, the load-carrying race 21, return passage 20 and an outer turnaround 15L of long arc in another of the end caps 4. The rollers 10 rolling through the load-carrying races 21 each have a circular rolling surface 50 which is on line contact with the load-carrying races 21, and axially opposite ends 51. Retainer plates 23 come into sliding contact with the axially opposite ends 51 of the rollers 10 to keep the rollers 10 against falling away apart from the slider 2 after the slider 2 has been dismantled away from the guide rail 1. The retainer plates 23 are each held to extend midway between the paired second raceway surfaces 17 on the carriage 3 by means of tightening straps 13, which are fastened to the slider 2 at their lengthwise opposite ends that fit into notches cut into the slider 2. With the linear motion guide unit of the present invention, moreover, a grease nipple 14 is mounted on an outward end of the end seal 12 to communicate with a lubrication port in the end cap 4. The end cap 4 as shown in FIGS. 1 and 3 has a concavity 52 recessed below an end surface adjoining the carriage 3. A lubricating member 11 impregnated with lubricant snugly fits into the concavity 52 in a fashion exposing in part the lubricating member 11 to the turnaround passage 15. The lubricating member 11 is made of a sintered resinous compact product which has open-porous or open-cellular texture whose pores or cells are open each other through interstices or channels. Lubricant is well absorbed and preserved in the pores or cells in the porous compact. The rollers 10, as rolling through the turnaround passage 21, are applied with the lubricant and, then, the rollers 10 coated with the lubricant in turn lubricate the load-carrying race 21 as they roll through the load-carrying race 21. Thus, the lubrication system constructed as stated just earlier, despite the slider 2 being compact or very short in length, helps steady and positive application of the lubricant around the rollers 10 with maintenance-free operation for lubrication over a prolonged service life.

The linear motion guide unit of the present invention features the circular sleeve 7 that fits into the lengthwise bore 8 in the carriage 3 of the slider 2. More especially, the constructional feature of the present invention is that the circular sleeve 7 is compact or very short and small in length and further portions or regions susceptible to elastic deformation in the circular sleeve 7 of the present invention don't rely on making a wall thickness of the circular sleeve 7 less over the regions to come under any elastic deformation, relying instead on the provision of slits 31, slots or narrow openings 34, and dents 35 and 36 on the circular wall of the circular sleeve 7 to define the regions susceptible to elastic deformation. With the linear motion guide unit of the present invention, the slider 2 is made miniature that is short and small, especially more compact or less in length compared with the standard sort of slider and therefore the carriage 3 is of necessity made compact or less in length. In the linear motion guide unit shown in FIG. 1, the carriage 3 has a length Lk making up 40% of a widthwise dimension of the carriage 3. More especially, the carriage 3 has the length which is equivalent to only about 60% of the standard sort of carriage. The circular sleeve 7 as shown in FIGS. 4 to 9 has the through-hole 9 of rectangular shape in transverse section, the rectangular shape being defined with lengthwise four sides which are made integral with each other whose corners are all ninety degree angles. Of four sides of the rectangular shape, one side includes a beam portion 25 supported at both ends thereof, or a bridged beam portion 25, and flanked with support beam portions 32 extending lengthwise, other side opposite to the one side includes cantilevered beam portions 26 lying in opposition to the bridged beam portion 25 and a middle support beam portion 27 flanked with the cantilevered beam portions 26 to retain the cantilevered beam portions 26, and the rest of the sides are lateral sides 37 lying in opposition to each other and joining with both the bridged beam portion 25 and the middle support beam portion 27. The circular sleeve 7 that fits into the lengthwise bore 8 in the carriage 3 in particular features two members of the class of the beam portions or regions susceptible to elastic deformation, which lie in diametrical opposition to each other with leaving any clearances between the circular sleeve 7 and the lengthwise bore 8. One of the two members of the class of the beam portions or regions susceptible to elastic deformation is the bridged beam portion 25 supported at both ends thereof and flanked with the support beam portions 32 which extend lengthwise to form an outside circular surface of the circular sleeve 7. Another of the two members of the class of the beam portions or regions susceptible to elastic deformation is a pair of the cantilevered beam portions 26 which are fastened or retained at their inward ends to the middle support beam portion 27 lying to form the outside circular surface of the circular sleeve 7 and freed at their outside ends to bend or warp.

Figure 7:
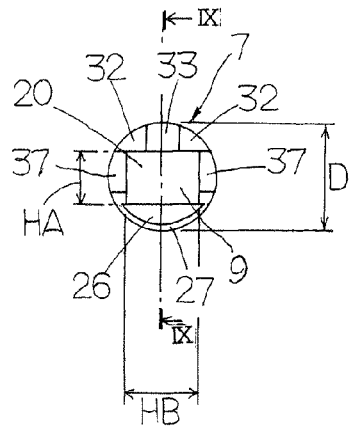
FIG. 7 is a view in side elevation of the circular sleeve of FIG. 4.
Figure 8:
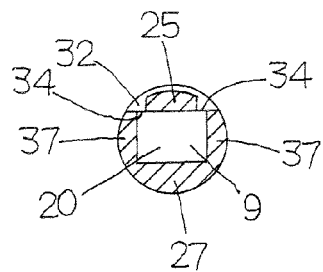
FIG. 8 is a view in cross-section of the circular sleeve, the view being taken on the plane of the line VII-VII of FIG. 4.
Figure 9:
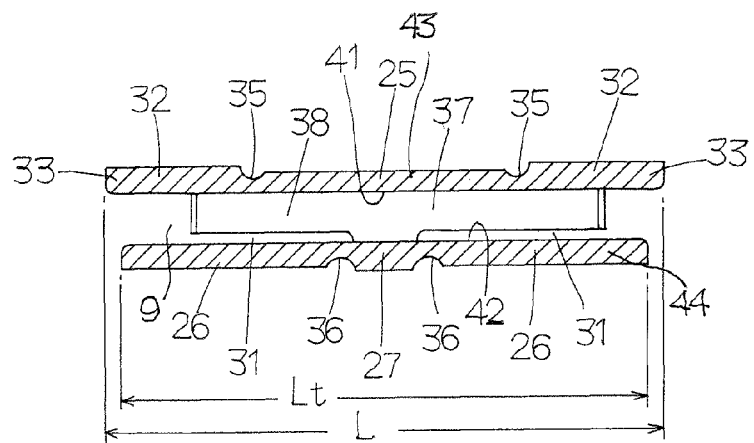
FIG. 9 is a view in longitudinal section of the circular sleeve, the view being taken on the plane on the line IX-IX of FIG. 7.

The circular sleeve 7 as shown in FIG. 3 fits into the lengthwise bore 8 to extend across the overall length of the lengthwise bore 8 in the carriage 3 whereby the through-hole 9 inside the circular sleeve 7 provides the return passage 20. Thus, it will be understood that the return passage 20 is defined with the through-hole 9 of rectangular shape in a transverse section made inside the circular sleeve 7 which fits into the lengthwise bore 8 in the carriage 3. With the linear motion guide unit constructed as stated earlier, moreover, the bridged beam portion 25 and the cantilevered beam portions 26 provide rolling contact surfaces 41 and 42 which make rolling contact with the circular rolling surfaces 50 of the rollers 10. The through-hole 9 of rectangular shape in a transverse section is made somewhat larger than the rollers 10 to make sure of smooth rolling movement of the rollers 10. The opposite short sides HA of the rectangular shape in the through-hole 8 constitute the lateral sides 37 which come into sliding contact with the axially opposite ends 51 of the rollers 10 and the opposite long sides HB of the rectangular shape constitute the bridged beam portions 25 and the cantilevered beam portions 26 both of which come into rolling contact with the circular rolling surfaces 50 of the rollers 10. The outside circular contour of the circular sleeve 7 as shown in FIG. 7 is circular in cross section in conformity with the lengthwise bore 8 in the carriage 3.

With the linear motion guide unit of the present invention, more especially, two members of the class of the beam portions susceptible to elastic deformation are provided to lie lengthwise on the opposite long sides HB which come into rolling contact with the circular rolling surfaces 50 of the rollers 10. One of the two members of the class of the beam portions susceptible to elastic deformation in the circular sleeve 7 is a region or portion supported at the both ends thereof and flanked with the support beam portions 32 which extend lengthwise to form an outside circular surface of the circular sleeve 7. The region is reduced radially to get spaced away from the lengthwise bore 8 in the carriage 3 by a clearance 39 and lengthwise isolated away from the lateral sides 37 by the slots or narrow openings 34 extending between the support beam portions 32 so as to make the regions or portion into the bridged beam portion 25 lying between the support beam portions 32 so as to suffer or undergo easily the elastic deformation. Another of the two members of the class of the beam portions susceptible to elastic deformation in the circular sleeve 7 is a pair of regions or portions which are in opposition to the bridged beam portion 25 and extended in opposite directions toward lengthwise opposite ends of the circular sleeve 7 from the middle support beam portion 27 lying to form the outside circular surface of the circular sleeve 7. The paired regions or portions are each reduced radially to get isolated away from the lengthwise bore 8 in the carriage 3 by a clearance 40. The paired regions or portions are further the slits at 31 lengthwise along the lateral sides 37 from the middle support beam portion 27 to the ends of the circular sleeve 7, thereby made into beam portions 44 or the cantilevered beam potions 26 which are fastened or retained at their inward ends to the middle support beam portion 27 and freed at their outside ends to bend or warp. That is, although but the sidewise opposite lateral sides 37 of the circular sleeve 7 is integral with the support beam portions 32 which support the bridged beam portion 25 between them, and at the same time is integral with the middle support beam portion 27 which bears the cantilevered beam portions 26, the lateral sides 37 are separated by the slots or narrow openings 34 from the bridged beam portion 25 while isolated by the slits 31 from the cantilevered beam portions 26. As a result of the construction as stated earlier, the bridged beam portion 25 and the cantilevered beam portions 26 are allowed to undergo the elastic deformation independently of each other.

Figure 4:
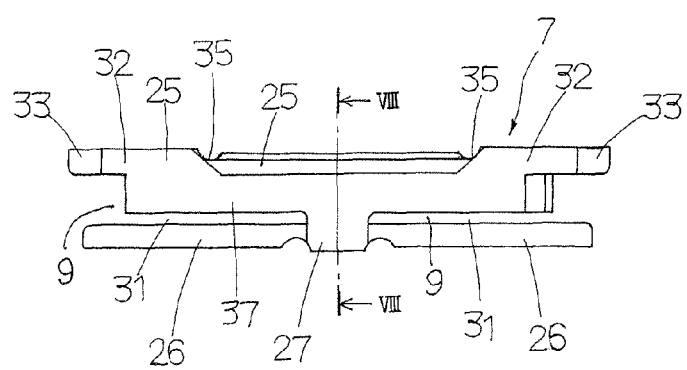
FIG. 4 is a view in front elevation showing a circular sleeve to be installed inside the linear motion guide unit of FIG. 1.
Figure 5:
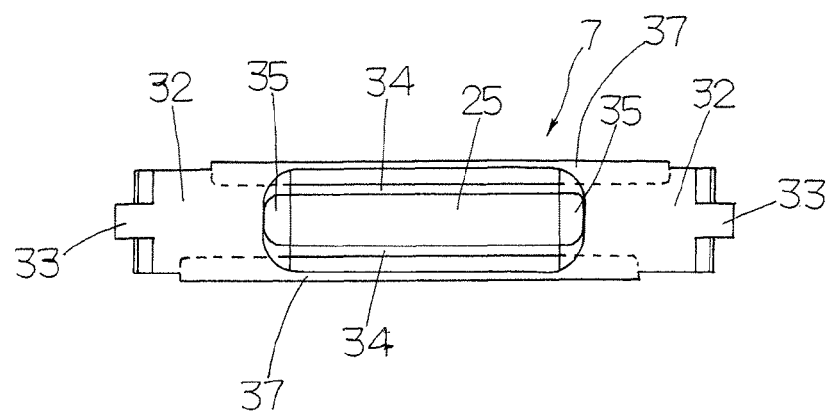
FIG. 5 is a view in plan showing the circular sleeve of FIG. 4.
Figure 6:
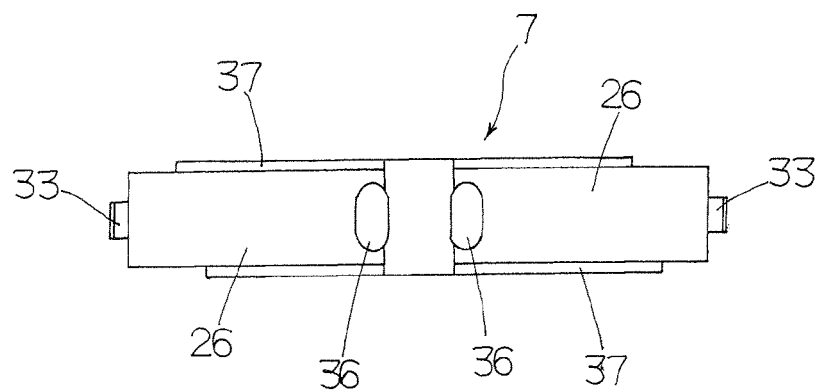
FIG. 6 is a view in bottom plan of the circular sleeve of FIG. 4.

The widthwise opposite short sides HA of the circular sleeve 7 confronting the axially opposite ends 51 of the rollers 10 have outside surfaces joining allover with the support beam portions 32. The widthwise opposite short sides HA further have inside even or flat lateral surfaces 38 defining the through-hole 9 so as to guide the axially opposite ends 51 of the rollers 10. The circular sleeve 7 over the overall length of the outside surface thereof fits snugly into the lengthwise bore 8 in the carriage 3 to make it possible to guide the axially opposite ends 51 of the rollers 10 in good circulating condition. Moreover, the flat lateral surfaces 38, as shown in FIGS. 4 to 6, are staggered each other in the lengthwise direction to make abutments at staggered positions against the turnaround passages 15 in the end caps 4, thereby to allow the axially opposite ends 51 of the rollers 10 transferring across the abutted boundaries at staggered abutted positions without getting caught or falling in any gap that would otherwise be liable to occur between abutted ends, making sure of smooth and orderly travel of the rollers 10 throughout the circulating circuits. With the version described herein, the circular sleeve 7 has an outside diameter D of 3.2 mm and a length Lt of 15 mm, and the rectangular shape of the through-hole 9 is defined by the short sides HA of 1.7 mm and the long sides HB of 2.2 mm.

With the circular sleeve 7 constructed as stated earlier, the cantilevered beam potions 26 are designed to more undergo the elastic deformation, compared with the bridged beam portion 25. In the version discussed herein, for example, the cantilevered beam potion 26, when stressed or loaded at the outermost end of the free end thereof with a force of 0.1 N, suffered a displacement of 0.2 mm at the outermost end of the free end, whereas the bridged beam portion 25, when loaded with a force of 0.1 N midway between the ends thereof, is suffered a displacement of 0.034 mm at the middle thereof. Thus, it was found that the cantilevered beam potions 26 were each about six times as easier to undergo the elastic deformation as the bridged beam portion 25. As a result, the cantilevered beam potions 26 were designed to undergo the elastic deformation even under a slight pressure or stress which would be caused by the rollers 10 while rolling through the return passage 20. The circulating circuit 30 in the linear motion guide unit of the present invention as shown in FIG. 3 is constituted with a load area of the load-carrying race 21 and non-loaded areas of the paired turnaround passages 15 and the return passage 20. In the load area, the rollers 10 of rolling elements apply the load or pressure to the raceway surface 16 of the guide rail 1 and the raceway surface 17 of the carriage 3. In the non-load area, the rollers 10 roll through over the paired turnaround passages 15 and the return passage 20 with a slight clearance spaced away from these passages.

As the slider 3 travels in the direction of an arrow v with respect to the guide rail 1, the rollers 10 of rolling elements while running through the circulating circuit 30 are liable to encounter any resistance at an entrance P across which the rollers 10 transfer from the non-load area to the loaded area and therefore hard to enter the load-carrying race 21, so that the slider 2 as well encounters variation in the sliding resistance. Thus, a crowning of gently curved shape has been conventionally made about the entrance area P into the carriage 3 to make entry of the rollers 10 into the load-carrying race 21 easier. However, the rollers 10, when coming into the entrance P with an askew posture where the rollers 10 tilt on their axes, are still hard to enter the load-carrying race 21 in spite of the crowning on the carriage 3 and therefore the slider 2 can't get rid of variation in the sliding resistance. With the roller-type linear motion guide unit stated earlier in the prior patent literature, to cope with problem as stated just above, the sleeve for the return passage had the radially reduced middle portion to provide an annular clearance around the circular sleeve away from the lengthwise bore in the carriage for the sake of elastic deformation to relieve of variation in the sliding resistance, thereby ensuring smooth sliding operation of the slider. Nevertheless, the major challenge as stated earlier remain in the roller-type linear motion guide unit in which the slider is compact in construction, especially very short in length.

Figure 10:
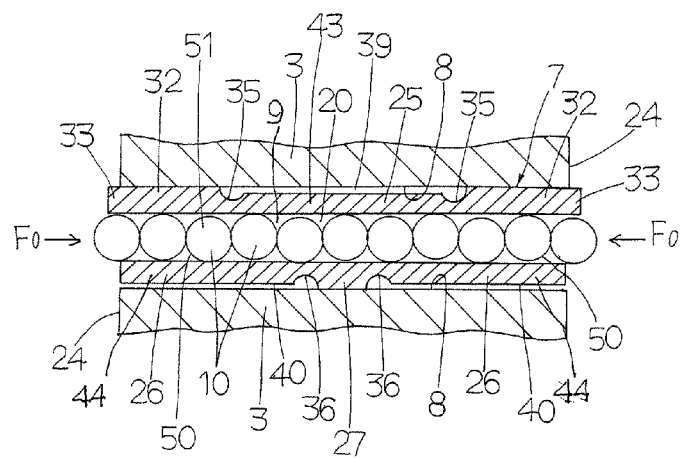
FIG. 10 is a view explanatory of the circular sleeve to constitute a return passage in the circulating circuit in which the circular sleeve is in a phase free of elastic deformation.
Figure 11:
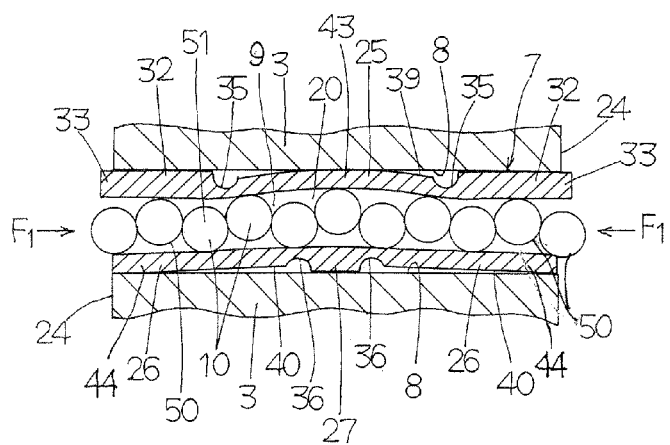
FIG. 11 is a view explanatory of the circular sleeve lying in another phase in which the circular sleeve undergoes elastic deformation at both a bridged beam portion and cantilevered beam portions thereof.
Figure 12:
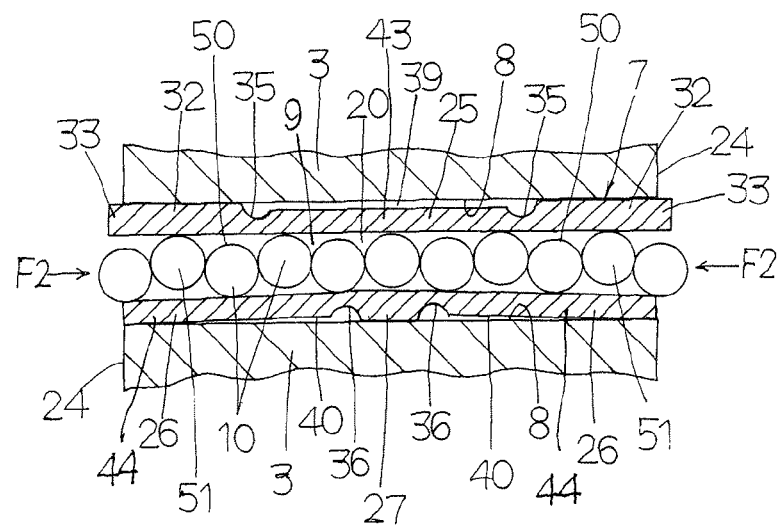
FIG. 12 is a view explanatory of the circular sleeve lying in a transitional phase in which the circular sleeve first turns from the phase free of any elastic deformation into a stressed phase in which the circular sleeve undergoes only at the cantilevered beam portions thereof.

In accordance with the present invention, the major challenge in the roller-type linear motion guide unit in which the slider is compact in construction and very short in length is resolved by the circular sleeve 7 which has therein the cantilevered beam portions 26 as shown in FIGS. 4 to 9 to make certain of smooth sliding operation of the slider 2 relative to the guide rail 1. With the linear motion guide unit in which the circular sleeve 7 is built in the slider 2, the rollers 10, when encountered to less circulating resistance (urging force F0) in the return passage in the slider 2, are allowed to normally run through the through-hole 9 in the circular sleeve 7 without causing any elastic deformations on either of the bridged beam portion 25 and the cantilevered beam portions 26 as shown in FIG. 10. In contrast, after the rollers 10 have once suffered any resistance at, for example the entrance area P into the load-carrying race 21 in the carriage 3 shown in FIG. 3, any urging force works on the rollers 10 in the turnaround passage 15 of non-loaded area and in turn the rollers 10 are impacted on the circular sleeve 7. As a result, the circular sleeve 7 first undergoes elastic deformation at the cantilevered beam portions 26 which are most susceptible to the elastic deformation and then suffer more elastic deformation at the bridged beam portion 25 under a further urging force or resistance force F1 as shown in FIG. 11. After both the bridges beam portions 25 and the cantilevered beam portions 26 have suffered the elastic deformation, intervals between any two adjoining rollers 10 shorten or reduce as shown in FIG. 11 and in doing so the slider 2 further travels over a distance twice as long as the reduction in intervals between any two adjoining rollers 10. As a result, the rollers 10 clogged at the entrance area P are allowed to easily transfer into the load-carrying race 21 of loaded area. The resistance force F1 becomes lost at the same time as transfer of the rollers 10 into the load-carrying race 21 of loaded area and the urging force applied to the rollers 10 rushes back into F0 with the result the circular sleeve 7 comes back to the phase shown in FIG. 10. The transition in phase as stated just earlier is carried out in an instant to ensure the smooth sliding movement of the slider 2. In an initial stage in which the circular sleeve 7 starts to vary from the phase of FIG. 10 to other phase of FIG. 11, the circular sleeve 7 first undergoes elastic deformation at the cantilevered beam portions 26 which are most susceptible to the elastic deformation. In some cases where the circular sleeve 7 suffers a slight urging force F2 (F0<F2<F1), only the cantilevered beam portions 26 at times can undergo the elastic deformation. Thus, either of the cantilevered beam portions 26 and the bridged beam portion 25 in the circular sleeve 7 can suffer the elastic deformation in two stages and therefore deal more flexibly with the clogged conditions of the rollers 10.

The cantilevered beam portions 26 and the bridged beam portion 25 in the circular sleeve 7 have the rounded dents 35 and 36 at their ends integrally joined with their respective support beam portions to make the elastic deformation easier and relieve any stress concentrations because of the elastic deformations to ensure the durability at their ends. More especially, the bridged beam portion 25 is made with the rounded dents 35 at boundaries between a middle beam portion 43 of the bridged beam portion 25 and the support beam portions 32 to render the middle beam portion 43 integral with the support beam portions 32 easier to suffer the elastic deformation. With the cantilevered beam portions 26, moreover, the rounded dents 36 are made at boundaries between the middle support portion 27 integral with the lateral sides 37 and the beam portions 44 integrally supported to the middle support portion 27 in a cantilevered fashion to make the beam portions 44 easier to undergo the elastic deformation. With the circular sleeve 7 constructed as stated earlier, the cantilevered beam portions 26 as shown in FIG. 3 come into mating with inside curved halves or portions of the turnaround passages 15. Therefore, even if the free ends of the cantilevered beam portions 26 shift or warp to cause any differences in level relative to the turnaround passages 15, such differences in level would have less influence on the traveling movement of the rollers 10 and in turn the sliding movement of the slider 2 than in outside curved halves or portion of the rolling motion of the turnaround passages 15. The bridged beam portion 25 is formed to come into mating with the outside curved halves of the turnaround passages 15. With the circular sleeve 7, moreover, the support beam portions 32 lying on opposite sides of the bridged beam portions 25 extend lengthwise over the cantilevered beam portions 26 to have protrusions 33. As shown in FIG. 3, the protrusions 33 fit into recesses 45 in the end caps 4 to keep the circular sleeve 7 against circular or angular movement thereof. As the overall length (L) including the bridged beam portion 25 is over the overall length (Lt) including the cantilevered beam portions 26 by the protrusions 33, mating edges between the circular sleeve 7 and the turnaround passages 15 on the sides of circular rolling surfaces 50 of the rollers 10 are staggered between the inside curved halves and the outside curved halves of the turnaround passages 15 from each other in a stepwise relation in a rolling direction of the rollers 10, so that the rollers 10 are permitted to move past across any mating edges between the circular sleeve 7 and the turnaround passages 15 without falling into or stumbling at the mating edges, thereby rolling throughout the circulating circuits 30 with no objection.

The circular sleeve 7 is preferably made of an integral compact of synthetic resins. An alternative, the circular sleeve 7 may be conventionally made in a two-piece construction in which the circular sleeve 7 is divided along the lengthwise middle of the long sides of the rectangular through-hole 9.

Although but the circular sleeve 7 is illustrated in application to the roller-type linear motion guide unit, it will be appreciated that the circular sleeve 7 may be applied to the ball-type linear motion guide unit as well.

What is claimed is:

1. A linear motion guide unit comprising; a guide rail having first raceway surfaces extending lengthwise and a slider that fits over or conforms to the guide rail for movement relatively to the guide rail, the slider being composed of a carriage having second raceway surfaces lying in opposition to the first raceway surfaces of the guide rail to define load-carrying races between the first raceway surfaces and the second raceway surfaces and return passages extending in parallel with the second raceway surfaces, end caps secured on opposite ends of the carriage, one to each end, the end caps each having turnaround passages to connect the load-carrying races with the return passages, circulating circuits each made up of the load-carrying race, the return passage and the turnaround passages, a plurality of rolling elements allowed to roll through the circulating circuits and circular sleeves that fit into lengthwise bores in the carriage to form the return passages;

wherein the circular sleeves that fit into the lengthwise bores in the carriage each have two members susceptible to elastic deformation with clearances between the circular sleeves and the lengthwise bore to undergo the elastic deformation under an impact force caused by the rolling elements, one of the two members susceptible to elastic deformation being a bridged beam portion supported at both ends thereof and flanked by support beam portions which extend lengthwise in opposite directions to form an outside circular surface of the circular sleeve, and another of the two members susceptible to elastic deformation being a pair of cantilevered beam portions which are fastened or retained to a middle support beam portion to form the outside circular surface of the circular sleeve and freed at outside ends thereof to bend or warp.

2. A linear motion guide unit constructed as defined in claim 1 wherein the rolling elements are rollers, the circular sleeve has a through-hole having a rectangular shape in a cross section, and the bridged beam portion and the cantilevered beam portions provide rolling contact surfaces which make line-contact with circular rolling surfaces of the rollers.

3. A linear motion guide unit constructed as defined in claim 1 wherein the bridged beam portion and the support beam portions are integral and rounded dents are formed at boundaries between a middle beam portion of the bridged beam portion and the support beam portions to render the middle beam portion easier to undergo the elastic deformation.

4. A linear motion guide unit constructed as defined in claim 1 wherein the cantilevered beam portions have rounded dents at ends thereof that are integrally joined with the middle support beam to make the cantilevered beam portions easier to undergo the elastic deformation.

5. A linear motion guide unit constructed as defined in claim 1 wherein the circular sleeve has sidewise opposite lateral sides which are integral with the support beam portions which support the bridged beam portion, and at the same time are integral with the middle support beam portion which bears the cantilevered beam portions, and wherein the lateral sides are separated by slots or narrow openings from the bridged beam portion while isolated by slits from the cantilevered beam portions, so that the bridged beam portion and the cantilevered beam portions are allowed to undergo the elastic deformation independently of each other.

6. A linear motion guide unit constructed as defined in claim 1 wherein the cantilevered beam portions mate with inside curved halves of the turnaround passages and the support beam portions extending on both sides of the bridged beam portions mate with outside curved halves of the turnaround passages.

7. A linear motion guide unit constructed as defined in claim 1 wherein the support beam portions lying on opposite sides of the bridged beam portions extend beyond ends of the cantilevered beam portions to form protrusions, and wherein the protrusions fit into recesses in the end caps.

8. A linear motion guide unit constructed as defined in claim 1 wherein lubricating members to apply lubricant around the rollers are placed between the carriage and the end caps in the slider.

* * * * *